United States Patent [19]
Cole

[11] Patent Number: 5,988,725
[45] Date of Patent: Nov. 23, 1999

[54] FOLDABLE TAILGATE RAMP FOR PICKUP TRUCKS

[76] Inventor: Leslie W. Cole, 14 Burrell Road, Turtle Creek, New Brunswick, Canada, E1J 1S6

[21] Appl. No.: 09/236,103

[22] Filed: Jan. 25, 1999

Related U.S. Application Data

[63] Continuation of application No. 09/178,743, Oct. 27, 1998, abandoned.

[51] Int. Cl.$^6$ .................................................. B62D 25/00
[52] U.S. Cl. .............................................. 296/61; 296/62
[58] Field of Search ........................ 296/61, 62; 414/537

[56] References Cited

U.S. PATENT DOCUMENTS

| | | | |
|---|---|---|---|
| 3,339,968 | 9/1967 | Hall | 296/61 |
| 3,352,440 | 11/1967 | Wilson | 356/142 |
| 3,642,156 | 2/1972 | Stenson . | |
| 3,737,058 | 6/1973 | Johnson | 296/61 |
| 3,756,440 | 9/1973 | Raap et al. | 296/61 |
| 3,976,209 | 8/1976 | Burton . | |
| 4,571,144 | 2/1986 | Guidry et al. . | |
| 4,735,454 | 4/1988 | Bernard . | |
| 4,795,304 | 1/1989 | Dudley . | |
| 4,864,673 | 9/1989 | Adaway et al. | 296/62 |
| 4,944,546 | 7/1990 | Keller . | |
| 5,133,584 | 7/1992 | McCleary . | |
| 5,156,432 | 10/1992 | McCleary . | |
| 5,273,335 | 12/1993 | Belnap et al. . | |
| 5,287,579 | 2/1994 | Estevez et al. . | |
| 5,312,148 | 5/1994 | Morgan . | |
| 5,342,105 | 8/1994 | Miles . | |
| 5,540,474 | 7/1996 | Holland . | |
| 5,752,800 | 5/1998 | Brincks et al. . | |
| 5,769,593 | 6/1998 | Buffaloc | 296/61 |
| 5,791,717 | 8/1998 | Reich et al. . | |
| 5,853,281 | 12/1998 | Farmer | 414/537 |

*Primary Examiner*—D. Glenn Dayoan
*Assistant Examiner*—Lori L. Coletta
*Attorney, Agent, or Firm*—Mario D. Theriault

[57] ABSTRACT

A foldable ramp having a first, second and third rectangular sections contiguous with each other and defining a ramp path having longitudinal and transversal axes. A first hinge group is affixed to both the first and second sections and a second hinge group is affixed to both the second and third sections. The first hinge group has a first axis of rotation on the upper side of the ramp path and extending across the longitudinal axis, and a first rotational range of slightly more than 180°. The second hinge group has a second axis of rotation on the under side of the ramp path and extending in a parallel alignment with the first axis of rotation, and a second rotational range of slightly less than 180°. The first and second hinge groups each have a central hinge and outside hinges, and stoppers on the central hinges to limit the rotation of the central hinges a few degrees less that the rotational range of the outside hinges. This configuration causes the ramp to arc longitudinally and transversely upwardly when deployed for increasing the moments of inertia of the ramp.

20 Claims, 4 Drawing Sheets

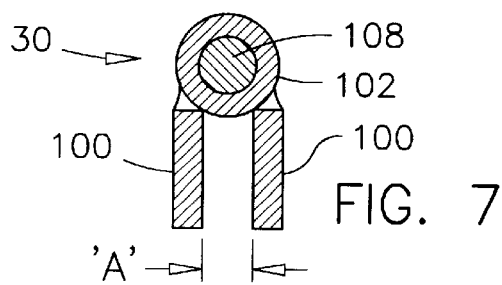
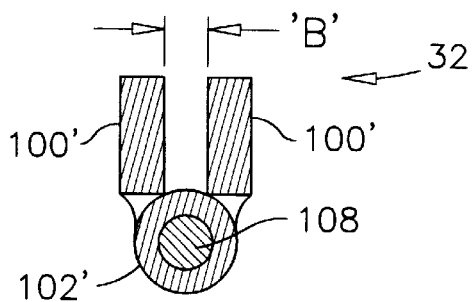
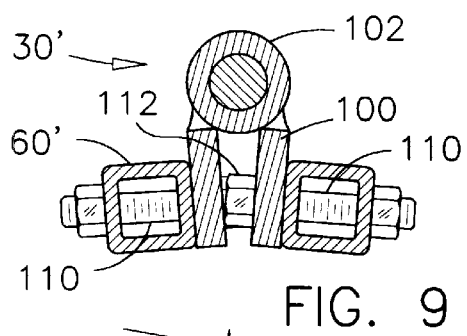
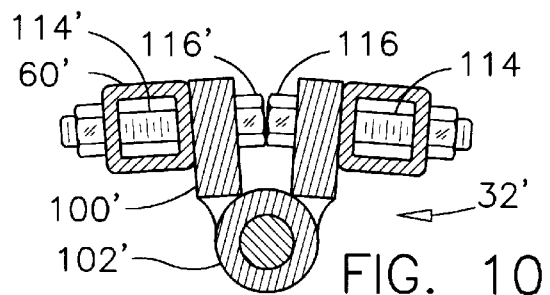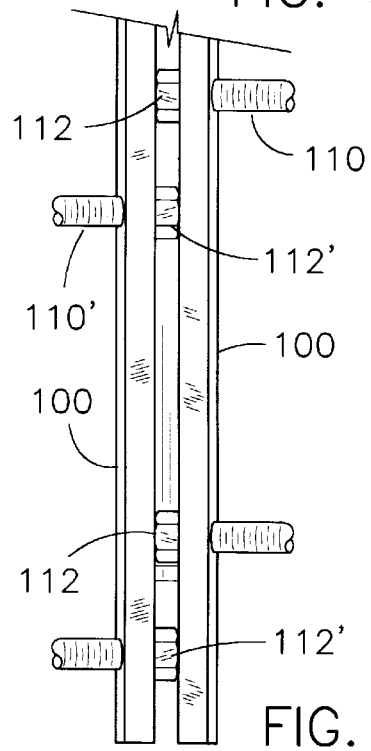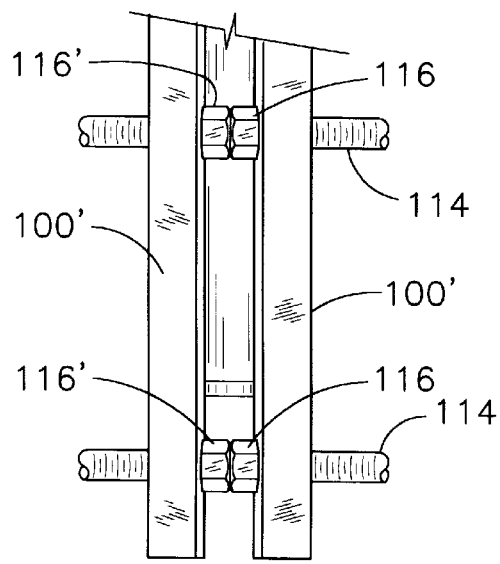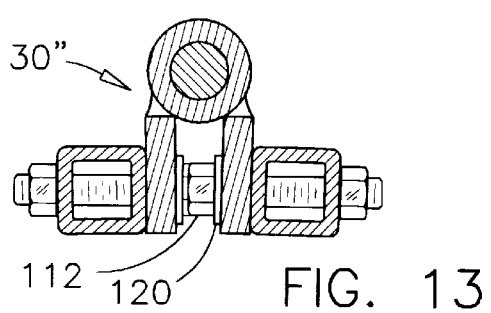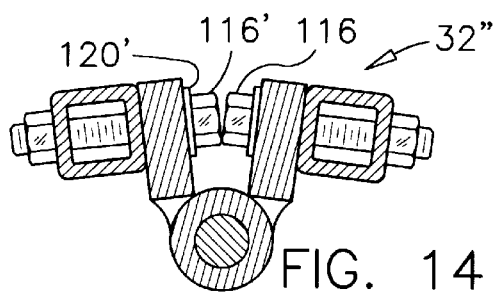

FOLDABLE TAILGATE RAMP FOR PICKUP TRUCKS

This is a continuation of U.S. patent application Ser. No.: 09/178,743, filed on Oct. 27, 1998, now abandoned.

FIELD OF THE INVENTION

This invention pertains to tailgate ramps for pickup trucks, and more particularly, it pertains to a multiple-section foldable tailgate ramp that is positional to define arcuate configurations along the longitudinal and transversal axes thereof.

BACKGROUND OF THE INVENTION

Many types of foldable tailgate ramp systems have been used in the past. In most designs, the objective was to increase a deployed length and strength of the ramp without unduly increasing the size of its structural members. This objective remains a primary requirement to any acceptable foldable ramp concept.

For reference purposes, the foldable tailgate ramps of the prior art are believed to belong to three broad groups. The first group utilizes longitudinal beams for stiffening a ramp in use; the second group uses trusses or mid-span legs to strengthen the hinges between each section of the ramp, and the third group uses the abutting edges of adjoining panels for preventing the hinges from folding when the ramp is extended.

Examples of tailgate ramps of the first group wherein longitudinal beams are used to strengthen a ramp, are disclosed in the following patent documents:

U.S. Pat. No. 5,540,474 issued on Jul. 30, 1996 to Richard T. Holland,

U.S. Pat. No. 5,752,800 issued on May 19, 1998 to Darryl Brincks et al.

In the first example, there is disclosed a tailgate ramp made in two sections that are hinged to one another. The ramp sections are constructed with marginal structural channel members and the panels are held in a planar alignment with each other by flat bars extending inside the channel members of both sections. In the second example, four ramp sections are maintained in a planar alignment with each other along an inclined path, by three support beams extending under the ramp, along the full length of the ramp.

In the second group of tailgate ramps of the prior art, the hinges are reinforced by inverted collapsible trusses mounted thereunder, or by foldable leg members extending from a mid-span portion of the ramp to the ground. Some examples of these designs are found in the following documents:

U.S. Pat. No. 3,976,209 issued on Aug. 24, 1976 to Edward E. Burton;

U.S. Pat. No. 4,571,144 issued on Feb. 18, 1986 to Donald C. Guidry et al.;

U.S. Pat. No. 4,795,304 issued on Jan. 3, 1989 to James D. Dudley;

U.S. Pat. No. 4,944,546 issued on Jul. 31, 1990 to William K. Keller;

U.S. Pat. No. 5,312,148 issued on May 17, 1994 to Alfred W. Morgan;

U.S. Pat. No. 5,342,105 issued on Aug. 30, 1994 to Mark R. Miles;

U.S. Pat. No. 5,791,717 issued on Aug. 11, 1998 to Terry Gene Reich et al.

In a third group of tailgate ramp systems, the rotation of the hinges between the panels and an associated sagging of the ramp under load are restricted by the abutment of the edges of adjoining panels, or by stopper blocks acting upon the hinges. In this third group, the following examples are found.

U.S. Pat. No. 3,642,156 issued on Feb. 15, 1972 to Raymond A. Stenson;

U.S. Pat. No. 4,735,454 issued on Apr. 5, 1988 to John N. Bernard;

U.S. Pat. No. 5,133,584 issued on Jul. 28, 1992 to Dennis M. McCleary;

U.S. Pat. No. 5,156,432 issued on Oct. 20, 1992 to Dennis M. McCleary;

U.S. Pat. No. 5,273,335 issued on Dec. 28, 1993 to Philip Belnap et al.;

U.S. Pat. No. 5,287,579 issued on Feb. 22, 1994 to Orestes Estevez, Jr.

While it is generally known in the field of Mechanical Design that the stiffness of a structure is directly proportional to its moment of inertia, none of the above tailgate ramp systems has means for advantageously blocking the hinges between the panels of a tailgate ramp, for causing the ramp to arcuate upwardly when deployed, thereby increasing its moments of inertia. Although the tailgate ramps of the prior art deserve undeniable merits, there is no known prior art that suggests that a strategic blocking of the hinges between the panels of a foldable tailgate ramp can substantially increase the strength of this ramp.

SUMMARY OF THE INVENTION

In the present invention, however, there is provided a foldable tailgate ramp for installation on a pickup truck, and which combines light weight with a remarkable strength.

In accordance with one aspect of the present invention, there is provided a foldable ramp comprising a first, second and third rectangular sections contiguous with each other and defining a ramp path having an upper side, an under side, a longitudinal axis oriented between the first and third sections, and a transversal dimension perpendicular to the longitudinal axis. The foldable ramp also has means for movably retaining and selectively steadying the first section thereof to a pickup truck.

There is also provided a first hinge group affixed to both the first and second sections for movably joining the first section to the second section. The first hinge group has a first rotational limit being defined by the positions of the first and second sections when the second section is laid against the first section. A second hinge group is affixed to both the second and third sections for movably joining the second section to the third section. The second hinge group has a second rotational limit being defined by the positions of the second and third sections when the third section is laid against the second section.

The first hinge group has a first axis of rotation on the upper side of the ramp path and extending across the longitudinal axis, and a first rotational range measured from the first rotational limit, of slightly more than 180°. The second hinge group has a second axis of rotation on the under side of the ramp path and extending in a parallel alignment with the first axis of rotation, and a second rotational range measured from the second rotational limit, of slightly less than 180°.

The principal advantage of this first aspect of the present invention is that the first, second and third sections are workable from a folded configuration wherein the first, second and third sections are laid over each other, to a deployed configuration wherein the ramp path is an upwardly arcuated pathway for stiffly supporting a vehicle moving thereon.

In accordance with another feature of the present invention, the first section is positional to make a reflex angle of between 188° to about 190° relative to the floor of a truck box, and the rotational ranges of the second and third sections are equivalent to the above reflex angle and to a mirror image of that reflex angle respectively. This feature has been found particularly advantageous for easily supporting a vehicle having a low undercarriage clearance.

In yet another feature of the present invention, there is provided a pair of link members which are connectable between the first section and one of or both the second and third sections for retaining the second and third sections in a perpendicular alignment with the first section. Therefore, when the first section is held horizontally, and the second and third sections are held vertically by the link members, the foldable tailgate ramp is usable as a truck bed extension for supporting equipment longer than the truck's box.

In accordance with another feature, the first section of the foldable ramp has a round tubing with notches therein for pivotal connection to the tailgate attachment bosses on a pickup truck. Therefore, the foldable ramp is mountable to a pickup truck in replacement of a common tailgate.

In yet another feature of the present invention, the first hinge group comprises a pair of spaced-apart first outside hinges and a first central hinge disposed between the first outside hinges, and the second hinge group comprises a pair of spaced-apart second outside hinges and a second central hinge disposed between the second outside hinges. The first and second central hinges are disposed along the longitudinal axis of the ramp and the first and second outside hinges are disposed at a common distance from the longitudinal axis.

The first and second central hinges have stoppers for restricting a rotation thereof a few degrees less than a rotation of the first and second outside hinges respectively. Hence, when said ramp path is deployed, at least one of the sections is adapted to be arced transversely, and a moment of inertia thereof along the longitudinal axis is relatively increased.

In yet another feature, each section has a plurality of reinforcing members extending in a parallel alignment with the longitudinal axis, in coincidental alignment with the positions of the first and second central and outside hinges. These reinforcing members add longitudinal stiffness to each section, and to each hinge group when that hinged group is arced transversely.

In yet another aspect of the present invention, the third section of the ramp comprises an endmost transversal structural member relative to the ramp, and this endmost transversal structural member is arced away from the second hinge group for further promoting the aforesaid transversal arcing of the third section.

Still other features of the foldable ramp of the present invention comprises the fact that it is manufacturable with very light structural members relative to its supporting capacity. Accordingly, it is susceptible of a low cost of manufacture with regard to both materials and labour. It is then susceptible of low prices of sale to the consumer, thereby making such foldable ramp economically available to the public.

BRIEF DESCRIPTION OF THE DRAWINGS

One embodiment of this invention is illustrated in the accompanying drawings, in which like numerals denote like parts throughout the several views, and in which:

FIG. 7 is a cross-section view of a hinge comprised in the first hinge group;

FIG. 8 is a cross-section view of a hinge comprised in the second hinge group;

FIG. 9 is a cross-section view of an outside hinge in the first hinge group as seen along line 9—9 in FIG. 5;

FIG. 10 is a cross-section view of an outside hinge in the second hinge group, as seen along line 10—10 in FIG. 5;

FIG. 11 is a bottom view of an outside hinge in the first hinge group;

FIG. 12 is a top view of an outside hinge in the second hinge group;

FIG. 13 is a cross-section view of a central hinge in the first hinge group, as seen along line 13—13 in FIG. 5;

FIG. 14 is a cross-section view of a central hinge in the second hinge group, as seen along line 14—14 in FIG. 5;

DETAILED DESCRIPTION OF THE PREFERRED EMBODIMENT

Figure 1:
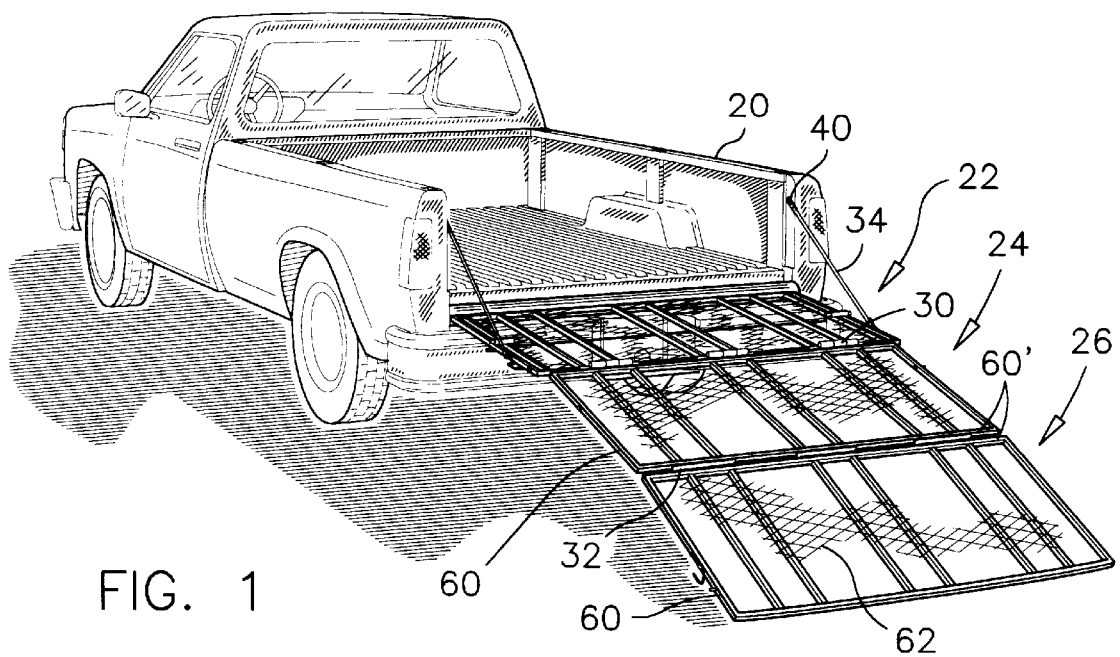
FIG. 1 is a perspective view of the tailgate ramp according to a preferred embodiment of the invention, mounted on a pickup truck.

While this invention is susceptible of embodiment in many different forms, there is shown in the drawings and will be described in details herein a specific embodiment, with the understanding that the present disclosure is to be considered as an example of the principles of the invention and is not intended to limit the invention to the embodiment illustrated.

Figure 2:
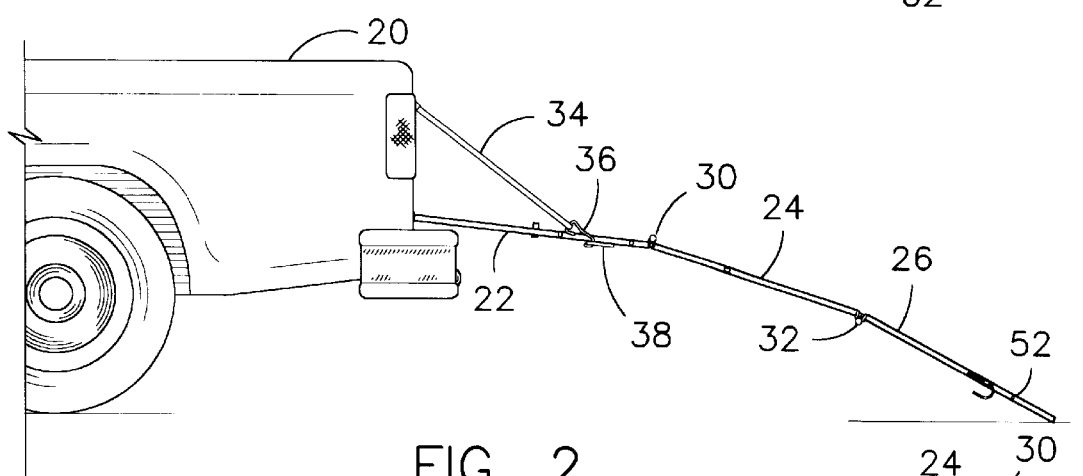
FIG. 2 illustrates a side view of the tailgate ramp according to the preferred embodiment.

The foldable tailgate ramp of the preferred embodiment is illustrated in a fully deployed mode in the accompanying FIGS. 1 and 2. The tailgate ramp is mountable to a pickup truck 20 as a replacement of a common tailgate on the truck box. The ramp is usable for loading an all-terrain-vehicle, a motorcycle, a snowmobile, a lawn tractor or a vehicle or equipment of the like into the truck box. The foldable tailgate ramp of the preferred embodiment comprises a forward rectangular section 22, an intermediate rectangular section 24 and a lower rectangular section 26. The three sections are hinged to each other, and the forward section 22 is hinged to the pair of pivot bosses (not shown) normally used for mounting the common tailgate of the pickup truck 20.

As can be seen in FIG. 2, the axis of the upper hinge group 30 between the forward and intermediate sections 22,24, is above the ramp, and the axis of the lower hinge group 32 between the intermediate section 24 and the lower section 26 is underneath the ramp. The foldable tailgate ramp of the preferred embodiment is thereby positional as to form an arcuate path along the length of the ramp as illustrated in FIG. 2. This feature will be explained later in greater details especially when making references to FIGS. 7–16.

The forward section 22 of the tailgate ramp is held in a horizontal or near a horizontal plane by means of a pair of tie straps 34 having each a hook 36 engaged into one of a pair of holed plates 38 affixed to the forward section 22. Each tie strap 34 is affixed to a pin 40 on the pickup truck box. The pins 40 are normally used for retaining linkages supporting a common tailgate.

Figure 5:
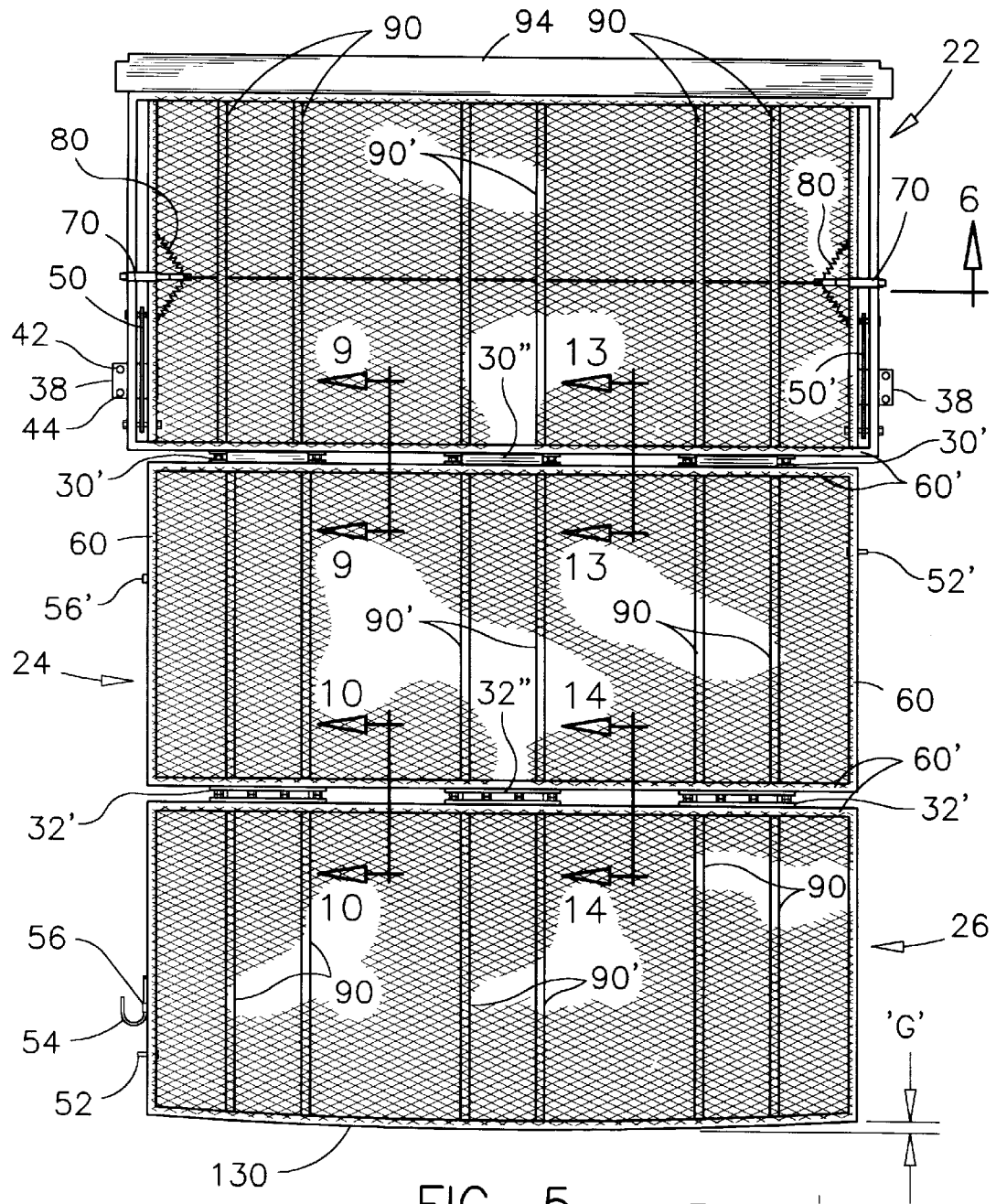
FIG. 5 is a plan view of the tailgate ramp according to the preferred embodiment.

Each holed plate 38, which is better illustrated in FIG. 5, has a pair of holes therein. A forward hole 42 is used for receiving the hook 36 for holding the forward section 22 in a slight downward inclination as illustrated in FIG. 2. The rearward hole 44 is used for receiving the hook 36 for retaining the forward section 22 in a horizontal alignment as illustrated in FIG. 3.

Figure 3:
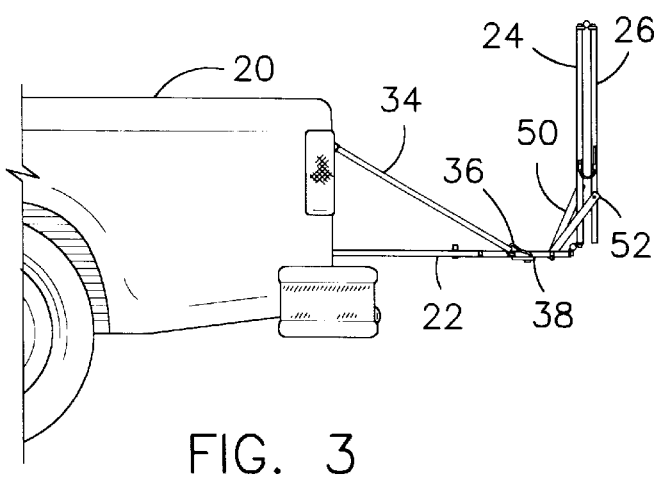
FIG. 3 is a side view of the tailgate ramp in a partially folded mode forming an extended truck bed.

The illustration in FIG. 3 shows the tailgate ramp of the preferred embodiment in a partly folded mode. This configuration is particularly useful for increasing the length of a truck box for transporting equipment such as a snowmobile for example which normally has a longer span than the length of the truck box. In this configuration, the intermediate section 24 and the lower section 26 are held in a vertical alignment by means of a pair of link bars 50 connected to the forward section 22. A first link bar 50 is connected to a first pin 52 on the lower section 26, and a second link bar 50' is connected to a second pin 52' on the intermediate section 24 for retaining both the intermediate section 24 and the lower section 26 against one-another. The second link bar 50' and the second pin 52' are illustrated in FIG. 5.

Figure 4:
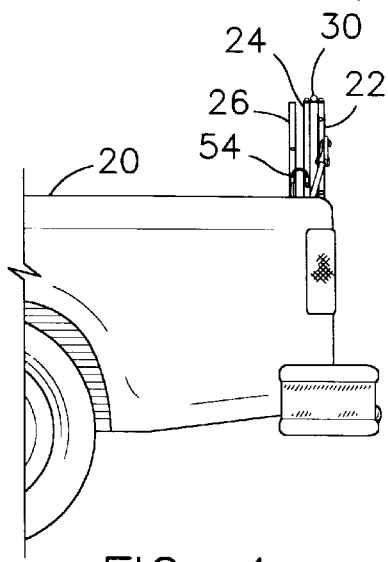
FIG. 4 is a side view of the tailgate ramp in a folded configuration.

Referring back to FIG. 4, the three sections of the tailgate ramp of the preferred embodiment are foldable in a vertical arrangement as illustrated therein when not used. When the tailgate ramp is stowed in this manner, the lower section 26 and the intermediate section 24 are preferably held against one-another by a U-shaped bolt 54 engaged in a pair of sockets 56,56, one on each section 24,26. The sockets 56,56' are illustrated in FIG. 5.

The three sections 22,24 and 26 are framed with hollow structural steel (HSS) members 60, and are covered with expanded metal grating 62. The preferred size of HSS members 60 is ¾ inch by ¾ inch by ⅛ inch. The preferred size of expanded metal grating 62 is ¾ inch by 13-gauge. This structure is advantageous for its light weight, its ease of manufacturing and for its low air resistance when stowed in the vertical position.

Figure 6:
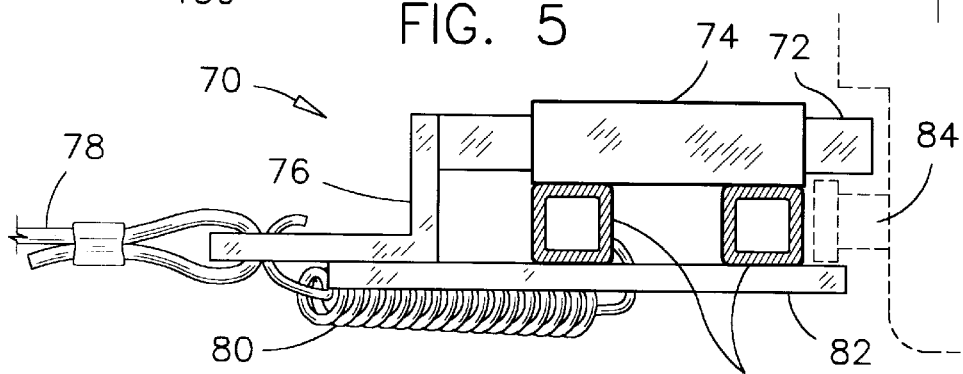
FIG. 6 is a detail of the latch mechanism of the tailgate ramp, as seen along line 6 in FIG. 5.

Referring now to FIGS. 5 and 6, the tailgate ramp of the preferred embodiment is lockable in the vertical stowed position by a pair of latch bolt assemblies 70 affixed to the forward section 22 of the ramp. Each latch bolt assembly 70 comprises a rectangular bolt 72 mounted in a rectangular sleeve 74. The sleeve 74 is affixed transversely to a pair of framing members 60. On the inside end of the bolt 72 relative to the forward section 22, there is provided a L-shaped bracket 76 to which a cable 78 is attached. A pair of springs 80 are connected to the L-shaped bracket 76 and to the grating 62 of the section 22, for pulling the latch bolt 72 outwardly relative to the forward section 22. A further guide plate 82 is affixed to the L-shaped bracket 76 and defines with the latch bolt 72 a space for enclosing the latch pin 84 along the rear vertical edge of the truck box, which pin is normally used for latching a common tailgate. The cable 78 preferably extends across the forward section 22 between the two latch bolt assemblies 70. Thus, the operation of both latch bolt assemblies 70 is simultaneously effected by pulling on the cable 78 in a direction perpendicular to the plane of the forward section 22.

The upper hinge group 30 comprises three equally-spaced-apart hinges; a pair of outside hinges 30' and a central hinge 30". Similarly, the lower hinge group 32 comprises a pair of outside hinges 32' and a central hinge 32". The structure of each section comprises a pair of longitudinal reinforcing members 90 extending longitudinally relative to the length of the ramp, within each section and in alignment with corresponding outside hinges 30',32'. A further pair of longitudinal reinforcing members 90' is provided along a longitudinal central region of each section. The reinforcing members 90 and 90' strengthen each section against bending stress in a direction along the length of the ramp when the ramp is being used. The reinforcing members 90,90' also strengthen the transversal members of each section against torsional stresses caused by the blocking of the hinges as will be explained later. The preferred type and dimensions of the reinforcing members 90,90' are HSS, ¾ inch by ¾ inch by ⅛ inch.

The forward framing member 94 of the forward section 22 is a round tubing having an outside diameter of about 1⅝ inch. Both ends of the tubing 94 are notched for mounting on the pivot bosses (not shown) of a pickup truck box as is customary with a common tailgate.

Referring now to FIGS. 7 to 16, there is illustrated therein the arrangement of the hinge groups for causing the tailgate ramp of the preferred embodiment to uphold an upward curvature and thereby to maintain higher moments of inertia. Each hinge in the upper hinge group 30 comprises a pair of flat bars 100 each being welded to a set of spaced-apart cylindrical sleeves 102. The sleeves welded to one flat bar are interposed between the sleeves welded to the other flat bar in a manner which is common to hinges. Similarly, each hinge in the lower hinge group 32 is made of a pair of flat bars 100' and cylindrical sleeves 102'. The pin 108 in each hinge is preferably a round bar having a diameter of about ⅝ of an inch. The cylindrical sleeves preferably have an outside diameter of about ⅞ of an inch. The length of engagement of the cylindrical sleeve over the round bar 108 is preferably about 7 inches. Other preferred dimensions for the hinges are that the flat bars 100 on the upper hinges 30 have a thickness of ¼ inch, a width of 1 inch and a length of about 10 inches. The flat bars 100' on the lower hinges 32 preferably have a thickness of ⅜ of an inch, a width of 1 inch and a length of about 10 inches.

The hinges 30,32 are affixed to each section using nominal ¼ inch machine bolts 110. Referring particularly to FIGS. 9 and 11, the bolts 110 used for retaining the upper hinge 30 to the forward and intermediate sections 22,24 are staggered relative to one-another such that the bolt head 112 of one bolt does not come in contact with the bolt head 112' of an opposite bolt when the ramp is unfolded.

The spacing 'A' between the flat bars 100 of the upper-hinges 30,30' when these flat bars are parallel to one another is slightly more than the thickness of the bolt head 112. The spacing 'A' is preferably sufficient for allowing a rotation of the intermediate section 24 relative to the forward section 22 of between about 185° to about 195°, when the bolt head 112 through one flat bar of an outside hinge 30' abut against the opposing flat bar 100 of that hinge.

Referring now particularly to FIGS. 10 and 12, the bolts 114,114' retaining the lower hinge group 32 to the intermediate and lower sections 24,26 are aligned with one-another such that the bolt heads 116,116' in opposed flat bars abut against each other when the tailgate ramp is fully deployed.

The spacing 'B' between the opposite flat bars 100' of a lower hinge 32,32' when these flat bars 100' are parallel to each other is slightly less than twice the thickness of a bolt head 112. The spacing 'B' is preferably sufficient for restricting the rotation of the lower section relative to the intermediate section to between about 168° and about 172°, when the opposite bolt heads 116,116' on the outside hinges 32' abut against one another.

Figure 15:
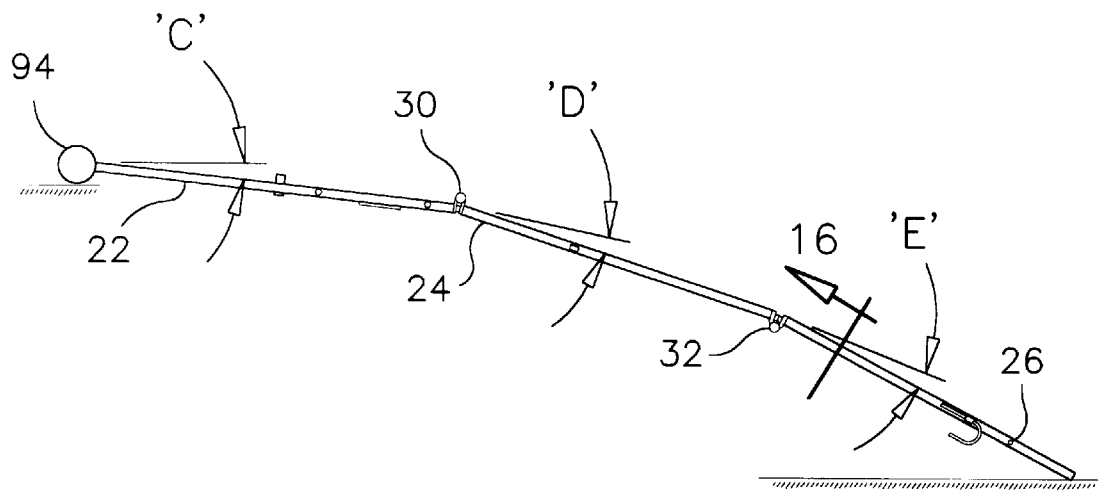
FIG. 15 is another side view of the tailgate ramp according to the preferred embodiment, in a deployed mode.

According to the above limitations of the upper and lower hinge groups, the tailgate ramp of the preferred embodiment is preferably unfolded such that the forward section 22 has an inclination 'C' as shown in FIG. 15, from an horizontal plane, of between about 8° to about 10°. The intermediate section 24 preferably has an inclination 'D' of about 8° to about 10° relative to the alignment of the forward section 22. The lower section 26 preferably has an inclination 'E' of between about 8° to about 10° relative to the alignment of the intermediate section 24.

The arcuate path defined by inclination of each section of the tailgate ramp as illustrated in FIG. 15 is particularly advantageous for loading equipment having a low undercarriage clearance, such as a large motorcycle or a tractor having a lawnmower mounted thereunder. The arcuate path defined by each section is further advantageous for increasing the moment of inertia of the longitudinal cross-section of the ramp and consequently for stiffening the ramp transversely.

Figure 16:
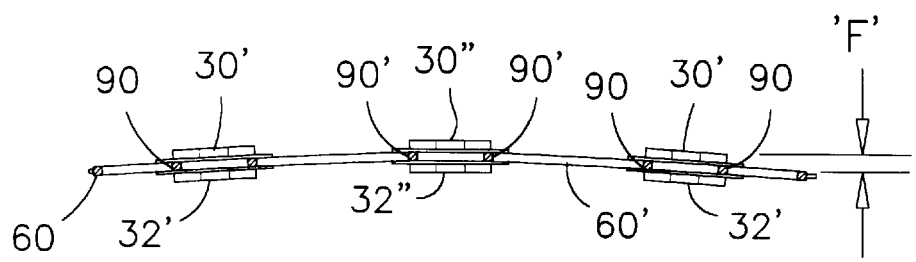
FIG. 16 is a cross-section view through the tailgate ramp along line 16 in FIG. 15.

Referring back particularly to FIGS. 13 and 14, the central upper hinge 30" and the central lower hinge 32" have washers 120,120' under the bolt heads 112,116 of the bolts retaining these hinges to the respective sections. The preferred thickness of each washer is about between 0.020 inch to about 0.080 inch. The purpose of these washers 120,120' under the bolt heads on the bolts of the central hinges 30",32" is to restrict the rotation of these hinges a few degrees less than the previously-stated rotational range of the outside hinges 30' and 32' respectively. When the tailgate ramp of the preferred embodiment is extended and loaded, the aforesaid blocking of the central hinges causes the central region of the tailgate ramp to remain higher than the side portions. In this respect and for reference purposes, a preferred median dimension of a transversal curvature of the ramp when the ramp is loaded, as shown as label 'F' in FIG. 16 is between about ⅛ of an inch to about ½ of an inch.

Therefore, when the ramp is loaded, the moment of inertia of a transversal cross-section of the ramp is substantially larger than the moment of inertia of a comparative flat cross-section having the same dimensions. The longitudinal strength of the ramp of the preferred embodiment is thereby increased accordingly.

Furthermore, the blocking of the central hinges 30",32" causes the transversal framing members 60' between each section to twist under load. The blocking of the central hinges and the twisting of the transversal framing members 60' also cause the central longitudinal reinforcing members 90' to flex when a load is carried on the ramp. Normally, without such blocking of the central hinges, these members would contribute very little strength to the supporting of a wide load such as an all-terrain-vehicle for example. In the normal case, the major part of the weight of the all-terrain-vehicle would be supported mainly by the longitudinal side members 60 and the longitudinal reinforcing members 90 along both sides of the ramp. The blocking of the central hinges as taught above contributes to pre-stressing the transversal members 60' and the longitudinal central reinforcing members 90' such that a load moving on the ramp is distributed across the entire ramp structure.

In order to further cause the ramp to initially flex transversely for increasing the moment of inertia of its transversal cross-section, the endmost member 130 of the lower ramp section 26 is preferably curved outwardly by a dimension of between about ¼ of an inch to about one inch as indicated by label 'G' in FIG. 5. When the ramp is deployed, the lower section 26 is resting against a flat surface and a four-wheeled vehicle for example is moved over the lower section 26 of the ramp, the weight of the vehicle causes the side portions of the ramp to flex downwardly relative to the central longitudinal region, thus adding to the transversal curvature 'F' and increasing the longitudinal strength of the ramp.

The tailgate ramp of the preferred embodiment is therefore substantially stronger than a comparable flat structure. The additional strength is obtained by an advantageous placement and configuration of the hinges, and the shape of the bottom member 130. The additional strength is obtained without adding significant material or fabrication cost to the ramp as compared with the flat structures of the ramps of the prior art.

As to the manner of usage and operation of the tailgate ramp of the preferred embodiment, the same should be apparent from the above description, and accordingly any further discussion related to the manner of usage and operation would be considered redundant and is not provided.

While one embodiment of the present invention has been illustrated in the accompanying drawings and described hereinabove, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. A foldable tailgate ramp for installation on a pickup truck, comprising:

a first, second and third rectangular sections contiguous with each other and defining a ramp path having an upper side, an under side, and longitudinal and transversal dimensions;

means for movably retaining and selectively steadying said first rectangular section to a pickup truck;

a first hinge group affixed to both said first and second rectangular sections for movably joining said first rectangular section to said second rectangular section;

a second hinge group affixed to both said second and third rectangular sections for movably joining said second rectangular section to said third rectangular section;

said first hinge group having a first axis of articulation on said upper side and extending along said transversal dimension, and means for allowing an articulation thereof over a first articulation range of more than 180°;

said second hinge group having a second axis of articulation on said under side and extending in a parallel alignment with said first axis of articulation, and means for restricting an articulation thereof within a second articulation range of less than 180°; and said third rectangular section having a planar configuration and an endmost transversal structural member, and said endmost transversal structural member being arced away from said second hinge group within a plane of said planar configuration;

such that said first, second and third rectangular sections are workable to form an upwardly arcuate pathway for easily and stiffly supporting a load moving thereon.

2. The foldable tailgate ramp as claimed in claim 1, wherein said first articulation range is between about 185 degrees and about 195 degrees, and said second articulation range is between about 168 degrees and about 172 degrees.

3. The foldable tailgate ramp as claimed in claim 1, wherein said means for movably retaining and selectively steadying said first rectangular section to a pickup truck comprises means for aligning said first rectangular section along a reflex angle relative to a horizontal plane.

4. The foldable tailgate ramp as claimed in claim 3, wherein said reflex angle is between about 188 degrees and about 190 degrees.

5. The foldable tailgate ramp as claimed in claim 3, wherein said means for aligning said first rectangular section also comprises adjustment means for adjusting said reflex angle.

6. The foldable tailgate ramp as claimed in claim 5, wherein said adjustment means is a pair of holed plates and a pair of strap members connect-able to said holed plates and to a pickup truck.

7. The foldable tailgate ramp as claimed in claim 1, wherein said first rectangular section comprises link members connect-able to one of said second and third rectangular sections for retaining said second and third rectangular sections in a perpendicular alignment therewith.

8. The foldable tailgate ramp as claimed in claim 1, wherein said first hinge group comprises a pair of spaced-apart first outside hinges and a first central hinge disposed between said first outside hinges, and said second hinge group comprises a pair of spaced-apart second outside hinges and a second central hinge disposed between said second outside hinges, and said first and second central hinges being disposed at a common distance from said first and second outside hinges respectively.

9. The foldable tailgate ramp as claimed in claim 8, wherein each of said first, second and third rectangular sections comprises reinforcing members extending in coincidental alignment with positions of said first and second central and outside hinges.

10. The foldable tailgate ramp as claimed in claim 1, wherein said means for movably retaining and selectively steadying said first rectangular section to a pickup truck comprises a round tubing having means for pivotal connection thereof to a pickup truck.

11. A foldable tailgate ramp for installation on a pickup truck, comprising:
a first, second and third rectangular sections contiguous with each other and defining a ramp path having an upper side, an under side, and longitudinal and transversal dimensions;
means for movably retaining and selectively steadying said first rectangular section to a pickup truck;
a first hinge group affixed to both said first and second rectangular sections for movably joining said first rectangular section to said second rectangular section;
a second hinge group affixed to both said second and third rectangular sections for movably joining said second rectangular section to said third rectangular section;
said first hinge group having a first axis of articulation on said upper side and extending along said transversal dimension and a first articulation range of more than 180°;
said first hinge group comprising a pair of spaced-apart first outside hinges and a first central hinge disposed between said first outside hinges;
said second hinge group having a second axis of articulation on said under side and extending in a parallel alignment with said first axis of articulation, and a second articulation range of less than 180°;
said second hinge group comprising a pair of spaced-apart second outside hinges and a second central hinge disposed between said second outside hinges;
said first and second central hinges being disposed at a common distance from said first and second outside hinges respectively;
each of said first and second central hinges having a hinge blocking means for restricting an articulation thereof relative to said first and second outside hinges respectively;
such that said first, second and third rectangular sections are workable to form a longitudinally and transversely upwardly arced pathway for easily and stiffly supporting a load moving thereon.

12. The foldable tailgate ramp as claimed in claim 11, wherein each of said first, second and third rectangular sections comprises spaced-apart transversal framing members defining a respective lenght thereof, and said hinges are affixed to said transversal framing members by bolts.

13. The foldable tailgate ramp as claimed in claim 12, wherein said hinge blocking means comprises said bolts, and bolt heads abutting against each other.

14. The foldable tailgate ramp as claimed in claim 13, wherein said hinge blocking means also comprises washers on said bolts.

15. The foldable tailgate ramp as claimed in claim 11, wherein said third rectangular section has a planar configuration, and an endmost transversal structural member, and said endmost transversal structural member is arced away from said second hinge group within a plane of said planar configuration.

16. The foldable tailgate ramp as claimed in claim 15, wherein a depth of a curvature of said endmost transversal structural member is between about one quarter of an inch to about one inch.

17. A foldable ramp for moving equipment thereon and comprising:
a plurality of juxtaposed rectangular sections defining a ramp path having longitudinal and transversal dimensions;
said plurality of rectangular sections comprising a first and second juxtaposed rectangular sections;
a hinge group affixed to both said first and second rectangular sections for movably joining said first rectangular section to said second rectangular section, and
said second rectangular section comprising an endmost transversal structural member spaced apart and arced away from said hinge group,
such that said second rectangular section is transversally arcuately formative for increasing a moment of inertia thereof.

18. The foldable ramp as claimed in claim 17, wherein said means for upwardly arcing at least one of said first and second rectangular sections comprises means for arcing said rectangular section over a height of between about ⅛ inch to about ½ inch.

19. The foldable ramp as claimed in claim 17, wherein said hinge group further comprises means for upwardly arcing at least one of said first and second rectangular sections along said transversal dimension.

20. The foldable tailgate ramp as claimed in claim 11, wherein said first rectangular section comprises link members connect-able to one of said second and third rectangular sections for retaining said second and third rectangular sections in a perpendicular alignment therewith.

* * * * *